United States Patent Office 3,260,609
Patented July 12, 1966

3,260,609
PAINT FORMULATIONS
George C. Reeser, Groves, Tex., assignor to Texaco Inc., New York, N.Y., a corporation of Delaware
No Drawing. Filed Dec. 22, 1960, Ser. No. 77,523
9 Claims. (Cl. 106—263)

This invention relates to coating compositions for surface protection. More particularly it pertains to paint formulations which form coatings having excellent wear, flexibility and corrosion resistant properties and in addition are resistant to normal paint deteriorations such as blistering, chalking, checking, flaking, cracking, chipping, and peeling.

There has long been a need for paint compositions particularly paint compositions which are employed in the protection of metal surfaces such as those of ships, pipelines and petroleum storage tanks which will not only effectively prevent the corrosion of the metals by air and moisture but are also resistant to the aforementioned deteriorations of paint. Furthermore there is a need for paint compositions which upon curing are sufficiently flexible to resist cracking, chipping and checking caused by the flexing of the surfaces they are coating. Still further in the deck and floor type paints there has been a continuous need for the development of a paint which is outstandingly resistant to wear. There is still a further need for a paint having all of the foregoing qualifications which can be applied to wet surfaces without deleterious effects on the resultant coating such as the blistering or peeling thereof.

It is therefore an object of this invention to provide a paint which can be applied to wet or dry surfaces.

It is another object of this invention to provide an anticorrosive paint composition which is also flexible, resistant to wear and other deteriorations associated with paints.

Additional objects of the invention will become apparent as the disclosure proceeds.

In accordance with the objects of the invention I have discovered that the incorporation of a petroleum oxidate in paint formulations comprising pigment and vehicle permits the paint to have good adherence on wet and dry surfaces while imparting to the paints flexible and corrosion inhibiting properties as well as resistance to the normal deterioration affecting paints such as those previously mentioned. Advantageously, the amount of petroleum oxidate employed in the paint compositions to accomplish the aforementioned objects is between about 5 and 60 vol. percent, preferably between 10 and 40 vol. percent, of the total composition. Paint compositions having oxidate contents above about 60% tend to have an undesirably long curing time and those having oxidates below about 5% appear relatively unaffected by the oxide ingredient.

The petroleum oxidates which have been found particularly suitable are the paraffinic oil oxidates derived from the oxidation of paraffinic lube oil fractions. These petroleum oxdates are a complex mixture of organic acids, alcohols, aldehydes, esters, lactones and ketones. They are characterized by a neutralization number (Neut. No.) between about 50 and 100, a saponification number (Sap. No.) between about 100 and 250 and an unsponifiable content less than about 60 wt. percent. The preferred paraffinic lube oil oxidates, have a Neut. No. between about 60 and 80, a Sap. No. between about 120 and 165 and an unsaponifiable content of less than about 50 wt. percent. The contemplated lube oil oxidates may be further characterized by a viscosity less than about 200 SUS at 210° F., preferably less than a 100 SUS at 210° F., a pour point less than about 30° F., preferably less than 10° F., and a Lovibond ½" cell color rating of less than about 200, preferably less than 100.

One method of obtaining the above lube oil oxidates is accomplished by reacting with air or another oxygen-containing gas a paraffinic lubricating oil having a viscosity between about 90 and 300 SUS at 100° F. (preferably between 140 and 180 SUS at 100° F.) and a pour point less than about 10° F. (preferably less than 5° F.) in the presence of an oxidation catalyst, e.g., 0.1–2 wt. percent $KMnO_4$ based on the weight of the charge oil, at an air feed rate of about 5–50 cu. ft./lb. lube oil/hr. (preferably 10–25 cu. ft.), at a temperature between 250–400° F. (preferably 260–370° F.), under a pressure from about 30 to 300 p.s.i.g. (preferably 50–90 p.s.i.g.) and at an oxygen-containing gas velocity of about 0.1 to 6 ft./sec. (preferably 0.2–1 ft./sec.). To obtain the oxidates of the aforementioned characteristics reaction times of the order of about 1 to 6 hrs. are generally necessary.

The paints to which the paraffinic lubricating oil oxidates hereinbefore described are incorporated are composed of pigment and vehicle. In the paint art pigment extenders and pigment suspending agents are considered a part of the pigment. Binders, thinner, driers, as well as optional ingredients such as anti-skin and anti-slip agents are considered part of the vehicle. The paint employed can be of the primer, enamel, glossy, semi-glossy or flat type. Examples of suitable pigments for my paint formulation include the inorganic and organic types well known in the art such as red lead, red iron oxide, white lead, zinc oxide, zinc chromate, titanium dioxide, lithopone, carbon black, and prussian blue.

Pigment extenders such as calcium carbonate, magnesium silicate, silica, aluminum silicate, abestine, talc, barytes, gypsum, clay or chalk may be employed in the paint if desired. Also pigments suspending agents such as aluminum stearate and zinc stearate can be employed.

Binders which can be employed include the vegetable oils such as linseed, both boiled and raw, soybean, tung oil, synthetic polyester type oils such as glycerine, erythritol or pentaerythritol esters of fatty acids or phthalic acid and their anhydrides, phenolic resins and alkyd solids. Examples of suitable thinners include mineral spirits (B.P. 150–215° C.), turpentine and petroleum naphtha. The driers which can be utilized include the naphthenates, oxides, resinates, oleates and acetates of cobalt, maganese, lead and zinc. The preferred driers are the naphthenates of cobalt, manganese and lead.

One method of preparing the paint compositions containing the petroleum oxidates contemplated herein is combining the lube oil oxidate and non-oxidate containing paint at temperatures ranging from ambient, e.g. 40° F., to about 150° F. At higher temperature there is the danger that some undesirable interaction will take place of the lube oil oxidate and/or other paint ingredients. At temperatures below about 40° F. the viscosity of the paint and oxidate ingredients may be such as to render mixing difficult. For those oxidates which are extremely viscous or of a semi-solid nature they may be cut back with a solvent such as kerosene or a petroleum naphtha to facilitate their incorporation into the paint. The amount of cutback solvent employed will of course depend on the viscosity desired. However, it has been found that lube oil oxidate concentrates having solvent contents between about 5 and 40 vol. percent are particularly advantageous in facilitating the mixing of the lube oil oxidates with the paint composition, particularly with paints containing no thinner.

In alternative methods of preparation, the oxides may be mixed with the pigment or vehicle of the paint before combining the pigment or vehicle and oxidate with the remaining components of the paint.

The following examples further describe the invention but it is not intended that these examples limit the scope of the invention. All percentages hereinbefore and hereinafter recited are based on volume unless otherwise stated.

EXAMPLE I

The following paint compositions were tested by their one coat application to painted and unpainted, wet and dry metal surfaces of tankers such as catwalks, decks, dry cargo hold decks, lower forcastle spaces and exterior hulls between the light and heavy load line. The paint compositions employed were prepared by mixing the oxidate with paint at a temperature between 50–100° F. The oxidates used in the paint compositions are designated as Oxidate A and Oxidate B. Both Oxidates A and B consist of two ingredients, namely, (1) a paraffinic lube oil oxidate having a Neut. No. of 70.7, a Sap. No. of 145, an unsaponifiable content of 43.5 percent, a viscosity of 84.2 SUS at 210° F., a 15.3° API gravity and a pour point of 0° F. and (2) kerosene as cutback solvent having an API gravity of 29° and a 50 vol. percent ASTM boiling point of 475° F. The kerosene constitutes 25 vol. percent of Oxidate A and 10 vol. percent of Oxidate B.

The paint compositions containing the oxidate and the non-oxidate control paint compositions are as follows:

*Paint I—control*

| | Wt. percent |
|---|---|
| Titanium oxide | 19.8 |
| Graphite black | 1.7 |
| Zinc chromate | 2.0 |
| Calcium carbonate | 8.6 |
| Long oil alkyd solids | 33.0 |
| Phenolic resin | 0.9 |
| Tung oil solids | 0.9 |
| Zn-, Co-, and Mn-naphthenate | 0.4 |
| Mineral spirits | 31.0 |
| Dipentine | 1.5 |
| Aluminum stearate | 0.2 |
| Pigment volume content, percent | 21.1 |
| Weight paint I/gallon, lbs. | 21.1 |

*Paint II—control*

| | |
|---|---|
| Ferric oxide | 14.4 |
| Aluminum silicate | 4.1 |
| Silica | 2.1 |
| Zinc stearate | 0.7 |
| Walnut shell flour | 5.1 |
| Phenolic resin | 0.9 |
| Tung oil | 17.0 |
| Linseed soil | 17.3 |
| Mineral spirits | 28.9 |
| Pb-, Co-, Mn-naphthenate | 1.2 |
| Petroleum naphtha | 8.3 |
| Pigment volume content, percent | 21.8 |
| Weight paint II/gallon, lbs. | 9.2 |

*Paint III—control*

| | |
|---|---|
| Ferric oxide | 20.2 |
| Silica | 4.7 |
| Magnesium silicate | 12.1 |
| Zinc oxide | 2.0 |
| Phenolic resin | 0.9 |
| Tung oil | 16.2 |
| Linseed oil | 16.2 |
| Mineral spirits | 26.5 |
| Pb-, Co-, Mn-naphthenate | 1.2 |
| Pigment volume content, percent | 25.5 |
| Weight paint III/gallon, lbs. | 10.6 |

*Paint IV—control*

| | |
|---|---|
| Carbon black | 4.3 |
| Lead oxide | 0.9 |
| Magnesium silicate | 16.1 |
| Phenolic resin | 0.9 |
| Tung oil | 25.9 |
| Pb-, Co-, Mn-naphthenate | 3.0 |
| Mineral spirits | 33.0 |
| Linseed oil | 15.9 |
| Pigment volume content, percent | 15.8 |
| Weight paint IV/gallon, lbs. | 8.6 |

*Paint V, V–A and V–B*

| | V—Vol. Percent | VA—Vol. Percent | VB—Vol. Percent |
|---|---|---|---|
| Paint I | 75 | 60 | 50 |
| Oxidate A | 25 | 40 | 50 |

*Paint VI*

| | Vol. percent |
|---|---|
| Paint I | 75 |
| Oxidate B | 25 |

*Paint VII*

| | |
|---|---|
| Paint II | 75 |
| Oxidate B | 25 |

*Paint VIII*

| | |
|---|---|
| Paint III | 75 |
| Oxidate B | 25 |

*Paint IX*

| | |
|---|---|
| Paint IV | 75 |
| Oxidate B | 25 |

After 1 to 6 months of exposure the aforementioned surface areas of the tankerships coated with the above described paint compositions I to IX were visually inspected. The inspection determined the oxidate containing paints V, V–A, V–B, VI, VII, VIII and IX showed little or none and in any case significantly less deterioration in respect to blistering, cracking, chalking, chipping and peeling than the non-oxidate containing paints I, II, III and IV. Furthermore, the oxidate paints V–IX were found more easily removable by scraping due to their flexibility from rusted and clean metal surfaces than the non-oxidate paints I–IV. This easy removal resulted in a great saving in time and money. Still further after scraping off the paints no evidence of corrosion was found on the originally clean metal surfaces covered by the oxidate containing paints and the corrosion was completely halted on rusted surfaces painted over by the oxidate paints. In addition scraping also readily removed rust coated by the oxidate paint. In contrast the control paints I–IV did not prevent rusting on the clean metal surfaces, did not prevent a continuance of the corrison process on rusted surfaces, and did not facilitate the easy removal of rust upon scraping. In this connection there was no evidence of rust bleeding through the oxidate paints where there was such evidence with the control paints. Finally the inspection revealed in the heavily trafficked areas, such as catwalks, that the test oxidate paints V–IX showed considerably less wear than the non-oxidate control paints.

EXAMPLE II

Paint VII of Example I was sprayed on three 18-gauge steel test panels (8″ x 11″) to form a paint coating of about 2–3 mils thickness. Just prior to spraying one of the test panels was clean, the second rusty-dry, and the third rusty-water wet. After spraying, the paint coatings on the test panels were allowed to cure for 192 hours. The coated test panels were then placed outdoors facing south at a 45° angle for 30 days. At the end of that period the test panel coatings were inspected and no deterioration of the coatings or rusting was evidenced.

I claim:
1. A paint composition consisting essentially of pigment and vehicle, having incorporated therein between about 5 and 60 volume percent based on said composition of a paraffinic lube oil oxidate of a Neut. No. between about 50 and 100, a Sap. No. between about 100 and 250 and an unsaponifiable content less than about 60 wt. percent based on said oxidate.

2. A paint composition consisting essentially of pigment and vehicle having incorporated therein between 10 and 50 volume percent based on said composition of a paraffinic lubricating oil oxidate characterized by a Neut. No. between about 60 and 80, a Sap. No. between 120 and 165 and an unsaponifiable content less than 50 wt. percent based on said oxidate.

3. A paint composition in accordance with claim 2 wherein said oxidate when incorporated in said paint composition is in admixture with kerosene in a volume ratio of 1:3.

4. A paint composition in accordance with claim 2 wherein said oxidate when incorporated in said paint composition is in admixture with kerosene in a volume ratio of 1:9.

5. A method of manufacturing an oxidate containing paint composition containing pigment and vehicle comprising mixing a paint comprising pigment and vehicle with a paraffinic lube oil oxidate at a temperature between about 40 and 150° F. in proportions sufficient to produce said paint composition having an oxidate content of between about 5 and 60 volume percent based on said paint composition, said oxidate being characterized by a Neut. No. between about 50 and 100, a Sap. No. between about 100 and 250 and an unsaponifiable content less than about 60 wt. percent based on said oxidate.

6. A paint composition consisting of a pigment and vehicle having incorporated therein between about 25 and 50 volume percent based on said composition of a kerosene solution of a paraffinic lube oil oxide having a Neut. No. between about 60 and 80, a Sap. No. between 120 and 165 and an unsaponifiable content less than 50 wt. percent of said oxidate, said solution containing 25 wt. percent kerosene and said vehicle and pigment comprising between 50 and 75 volume percent of said composition and consisting of titanium oxide, graphite black, zinc chromate, calcium carbonate, long oil alkyd solids, phenolic resin, tung oil solids, zinc naphthenate, cobalt naphthenate, manganese naphthanate, dipentine and aluminum stearate.

7. A paint composition consisting of pigment and vehicle having incorporated therein 25 volume percent of a kerosene solution of a paraffinic lubricating oil oxidate characterized by a Neut. No. between about 60 and 80, a Sap. No. between 120 and 165 and an unsaponifiable content of less than 50 wt. percent on said oxidate, said solution containing 10 volume percent kerosene, and said pigment and vehicle being 75 volume percent of said composition and consisting of ferric oxide, aluminum silicate, silica, zinc stearate, walnut shell flour, phenolic resin, tung oil, linseed oil, mineral spirits, lead naphthenate, cobalt naphthenate, manganese naphthenate. and petroleum naphtha.

8. A paint composition consisting of pigment and vehicle having incorporated therein 25 volume percent based on said composition of a kerosene solution of a paraffinic lubricating oil oxidate characterized by a Neut. No. between about 60 and 80, a Sap. No. between 120 and 165 and an unsaponifiable content less than 50 wt. percent based on said oxidate, said solution containing 10 volume percent kerosene, and said pigment and vehicle being 75 volume percent of said composition and consisting of ferric oxide, silica, magnesium silicate, zinc oxide, phenolic resin, tung oil, linseed oil, mineral spirits, lead naphthenate, cobalt naphthenate and manganese naphthenate.

9. A paint composition consisting of pigment and vehicle having incorporated therein 25 volume percent based on said composition of a kerosene solution of a paraffinic lubricating oil oxidate characterized by a Neut. No. between about 60 and 80, a Sap. No. between 120 and 165 and an unsaponifiable content less than 50 wt. percent based on said oxidate, said solution containing 10 volume percent kerosene said vehicle and pigment being 75 volume percent of said composition, and consisting of carbon black, lead oxide, magnesium silicate, phenolic resin, tung oil, lead naphthenate, cobalt naphthenate, manganese naphthenate, mineral spirits and linseed oil.

References Cited by the Examiner

UNITED STATES PATENTS

| | | | |
|---|---|---|---|
| 1,385,034 | 7/1921 | Blakeman | 106—265 |
| 1,385,036 | 7/1921 | Blakeman | 106—265 |
| 2,752,264 | 6/1956 | Picknell | 106—264 XR |
| 2,922,769 | 1/1960 | Cody | 106—264 XR |
| 2,978,424 | 4/1961 | Atwood et al. | 106—264 XR |
| 3,036,903 | 5/1962 | Kirkwood et al. | 260—451 |
| 3,061,452 | 10/1962 | Convery | 106—264 XR |

OTHER REFERENCES

Singer, Fundamentals of Paint, Varnish and Lacquer Technology, The American Paint Journal Company, May 1957, pages 1–108 relied upon.

ALEXANDER H. BRODMERKEL, *Primary Examiner.*

JOSEPH REBOLD, MORRIS LIEBMAN, *Examiners.*

J. E. POER, J. E. CARSON, J. B. EVANS,
*Assistant Examiners.*